(12) United States Patent
Bernardi

(10) Patent No.: US 8,727,106 B2
(45) Date of Patent: May 20, 2014

(54) TRACTION UNIT PARTICULARLY FOR PACKAGING MACHINES

(75) Inventor: Francesco Maria Bernardi, Bologna (IT)

(73) Assignee: Tissue Machinery Company S.p.A., Granarolo Dell'Emilia ( * ) Notice: Subject to any disclaimer, the term of this patent is extended or adjusted under 35 U.S.C. 154(b) by 0 days.

(21) Appl. No.: 13/386,398

(22) PCT Filed: Jul. 22, 2009

(86) PCT No.: PCT/EP2009/059409
§ 371 (c)(1),
(2), (4) Date: May 1, 2012

(87) PCT Pub. No.: WO2011/009485
PCT Pub. Date: Jan. 27, 2011

(65) Prior Publication Data
US 2012/0273329 A1 Nov. 1, 2012

(51) Int. Cl.
*B65G 25/00* (2006.01)
(52) U.S. Cl.
USPC .................... 198/803.1; 198/670; 198/661
(58) Field of Classification Search
CPC ....... B65B 59/005; B65B 59/02; B65G 17/26
USPC ................ 198/803.1, 661, 670, 803.3, 803.7, 198/803.9, 470.1, 606, 531
See application file for complete search history.

(56) References Cited

U.S. PATENT DOCUMENTS

| 5,465,550 A | 11/1995 | Dall'Omo |
| 7,789,219 B2 * | 9/2010 | Baldanza et al. .......... 198/803.1 |
| 2002/0059784 A1 * | 5/2002 | Gamberini ...................... 53/531 |

FOREIGN PATENT DOCUMENTS

| EP | 1 312 549 A1 | 5/2003 |
| EP | 1 655 230 A1 | 5/2006 |

* cited by examiner

*Primary Examiner* — Gene Crawford
*Assistant Examiner* — Lester Rushin
(74) *Attorney, Agent, or Firm* — Seed IP Law Group PLLC

(57) ABSTRACT

A traction unit (1), particularly for packaging machines, comprising means for moving at least one grip element (2), which can move along a predefined closed path (3) and has at least two pairs of teeth (4a, 4b) which protrude substantially at right angles from the closed path (3), for the clamping of products (5) to be packaged and their traction along a portion of the closed path (3); the mutual transverse arrangement of the pairs of teeth (4a, 4b) being configurable by means of an adjustment device (6) which is located substantially outside the closed path (3), the movement means being located substantially inside the closed path (3).

11 Claims, 3 Drawing Sheets

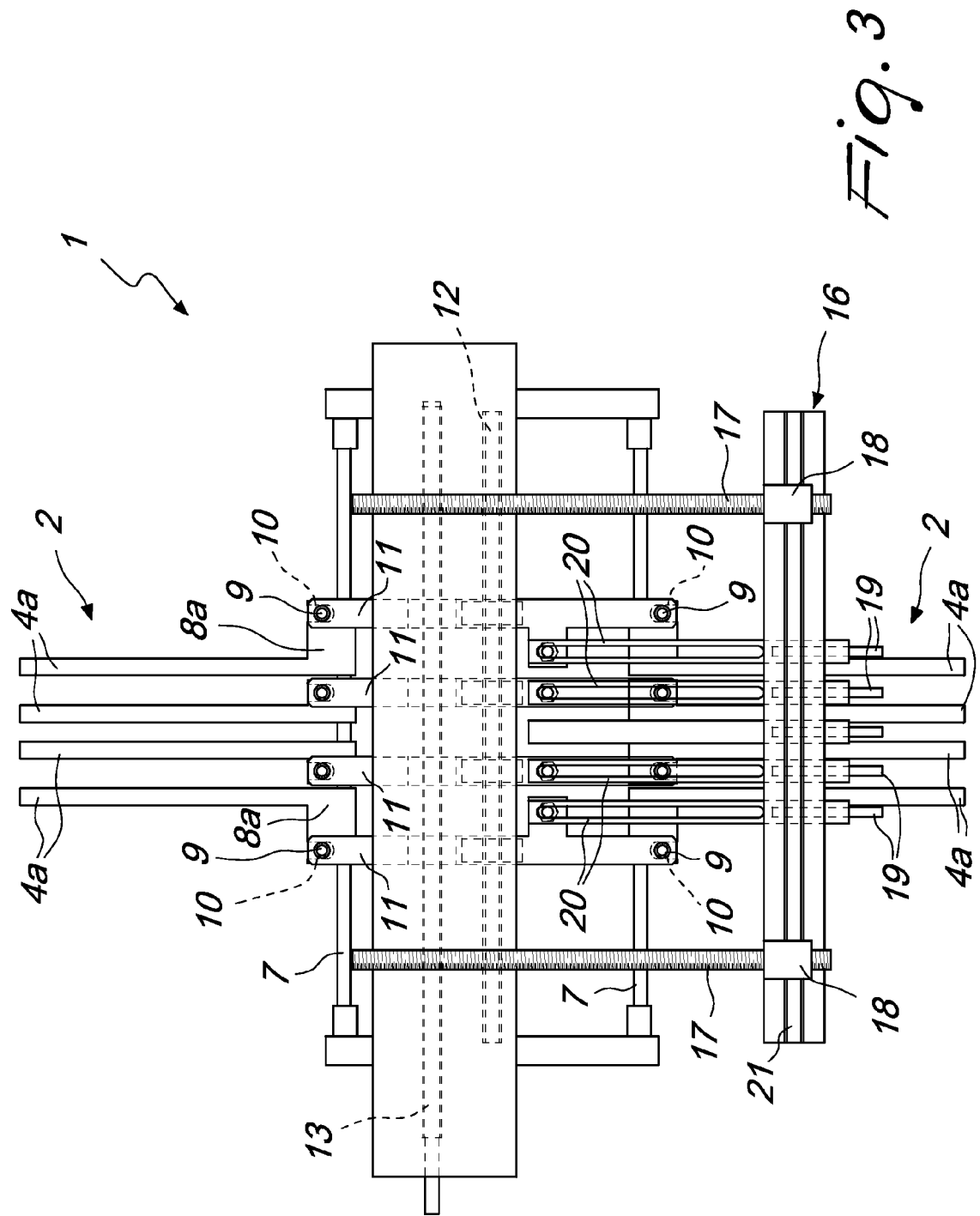

TRACTION UNIT PARTICULARLY FOR PACKAGING MACHINES

TECHNICAL FIELD

The present invention relates to a traction unit particularly for packaging machines.

BACKGROUND ART

In the field of packaging machines for various types of articles, and in particular for rolls of paper of the so-called "tissue" type, for example absorbent paper or toilet paper, machines are widespread which are capable of packaging a predefined number of rolls, arranged according to the multiple rows and layers configuration that is commonly sold to the final consumer.

According to a known constructive solution, these machines are provided first of all with roll feeders, which are controlled by movement means, for example conveyor belts or platforms, along which there are distribution elements capable of arranging the rolls in the desired configuration.

Subsequently, the rolls thus ordered are sent to a traction unit, which moves them while the subsequent steps of the execution of the wrapping cycle are performed on them.

More particularly, appropriately provided and shaped elements wrap the rolls by means of a film; heat-sealing heads then complete the wrapping cycle and ensure the closure of the package by acting on the folded flaps of film.

Typically, such traction units are provided with a motor that is capable of moving a plurality of grip elements along a substantially annular path.

The above-mentioned grip elements are provided with a series of mutually opposite teeth capable of clamping the rolls during their movement. In order to adapt to the various formats that can be provided for the package to be provided, the traction unit must be equipped with means for adjusting the grip elements and the teeth in particular, whose position must be adapted to the different dimensions of the assembly to be moved.

According to a known constructive solution, the grip elements are constituted by sliders carried by carriages, which are arranged transversely with respect to the advancement direction; the teeth that retain the rolls extend from the sliders at right angles with respect to the plane of the carriages (in this manner it is possible to arrange a plurality of sliders along the same carriage, so that each grip element is in practice composed of multiple teeth arranged side by side).

The adjustment means are constituted by toothed belts or chains, which wind around pulleys that can move transversely with respect to the advancement direction and engage slots provided below the sliders.

In this manner, the belts or chains can perform the function of moving the grip elements, and therefore the rolls, but also the function of adjusting the transverse position, since they, as well as the pulleys around which they are wound, are capable of moving transversely with respect to the advancement direction of the grip elements.

However, this solution is not free from drawbacks. The arrangement of the above-mentioned adjustment and movement means below the sliders and therefore inside the annular path along which the grip elements work generates a structural complexity that designers have to cope with during the definition of the general layout of the machine.

Moreover, the movement means must be ensured the possibility to recover the elongation that they undergo over time, be it elastic, as in the case of belts, or due to wear, as in the case of chains.

This need increases the complexity, from a structural standpoint, of the provision of such means, since they must meet the task of movement and transverse adjustment and at the same time be capable of recovering elongations.

DISCLOSURE OF THE INVENTION

The aim of the present invention is to solve the above-mentioned drawbacks, by providing a traction unit particularly for packaging machines that is structurally very simple and suitable for transverse adjustment.

Within this aim, an object of the invention is to provide a traction unit in which the means for adjusting the transverse position adapt to any elongations of the movement means.

Another object of the invention is to provide a traction unit that allows control of the movement of the grip elements also along the curved portions of the trajectory.

Another object of the invention is to provide a traction unit that ensures high reliability in operation.

Another object of the invention is to provide a traction unit that can be obtained easily starting from commonly commercially available elements and materials.

Another object of the invention is to provide a traction unit that has a low cost, is relatively simple to provide in practice, and is safe in application.

This aim and these and other objects, which will become better apparent hereinafter, are achieved by a traction unit, particularly for packaging machines, which comprises means for moving at least one grip element, which can move along a predefined closed path and has at least two pairs of teeth that protrude substantially at right angles from said closed path, for the clamping of products to be packaged and their traction along a portion of said closed path, the mutual transverse arrangement of said pairs of teeth being configurable by means of an adjustment device, characterized in that said adjustment device is located substantially outside said closed path, said movement means being located substantially inside said closed path.

BRIEF DESCRIPTION OF THE DRAWINGS

Further characteristics and advantages of the invention will become better apparent from the following detailed description of some preferred but not exclusive embodiments of the traction unit according to the invention, illustrated by way of non-limiting example in the accompanying drawings, wherein:

FIGS. 2 and 3 are front elevation views of the traction unit according to the invention and illustrate two possible arrangements of the grip elements.

WAYS OF CARRYING OUT THE INVENTION

Figure 1:
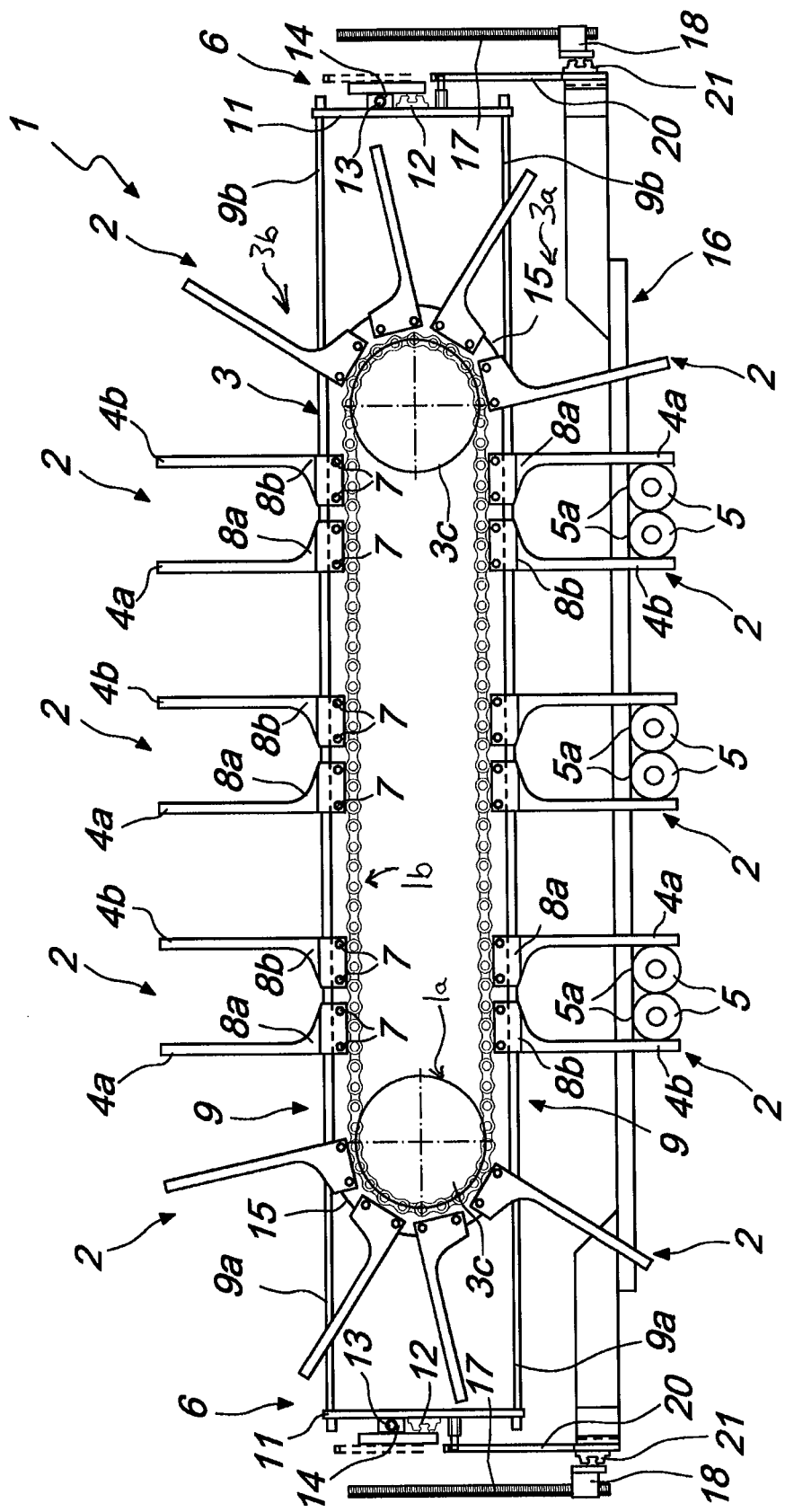
FIG. 1 is a schematic side elevation view of a traction unit according to the invention.

With reference to the figures, a traction unit according to the invention, generally designated by the reference numeral 1, comprises means for the movement which includes a drive wheel 1a and chain 1b of at least one grip element 2 that can move along a predefined closed path 3. Further examples of the means for movement and other structures that are described herein and can be used with this invention are found in U.S. application Ser. No. 13/381,848, filed Dec. 30, 2011 and commonly owned, which is incorporated herein by reference in its entirety.

The grip element 2 comprises at least two pairs of teeth 4a, 4b, which protrude substantially at right angles from the closed path 3. The teeth 4a, 4b are arranged mutually opposite, so that the two pairs, which are mutually parallel, can clamp laterally a set of products 5 to be packaged and can pull them along a portion of the closed path 3. The products 5 are for example of the type of rolls of toilet paper, absorbent paper or the like.

The products 5 are delivered to the grip element 2, for example by a pusher that can perform a translational motion along a substantially vertical direction. Their spatial configuration (typically a set of products 5 arranged on multiple rows and layers) is obtained in the preceding steps of the wrapping cycle and must be maintained by the grip element 2 during traction, while the subsequent processing steps are performed.

In particular, the closed path 3 has:
a first substantially straight portion 3a for the traction of the products 5 to be packaged;
a second substantially straight portion 3b, which is parallel to the first portion 3a, for the return stroke of the grip element 2;
two substantially semicircular connecting portions 3c.

In order to adapt to the different formats of products 5 and to the different number of rows and/or layers of the set to be moved, the mutual position of the pairs of teeth 4a, 4b transversely to the advancement direction can be configured at will by means of an adjustment device 6.

According to the invention, the adjustment device 6 is located substantially outside the closed path 3 and in this manner does not interfere with the movement means, which are instead located substantially inside the closed path 3.

In order to provide the coupling between the grip element 2 and the movement means, such movement means can have stems 7 arranged along the closed path 3 transversely with respect to the advancement direction. The stems 7 engage appropriately provided holes formed inside sliders 8a, 8b, which belong to the grip element 2 and from which the teeth 4a, 4b protrude.

In order to provide transverse adjustment, the teeth 4a, 4b can slide along the stems 7, which in turn are jointly supported by chains or belts wrapped around pulleys arranged inside the closed path 3.

Preferably, the traction unit 1 according to the invention comprises a plurality of grip elements 2: the larger number of grip elements 2 that act (which in any case might be slightly more than one, in order to maintain a margin for optimizing the accelerations of the various parts) allows to reduce the operating speed of each one of the grip elements 2, further ensuring the possibility to process simultaneously a larger number of products 5, with the result of increasing the efficiency of the traction unit 1.

Conveniently, the adjustment device 6 comprises at least one bar 9, which is arranged parallel with respect to a fraction of the closed path 3 and can move on command along a direction that is transverse with respect to the advancement direction of the grip elements 2. At the above mentioned fraction of the closed path 3, the bar 9 engages in a respective seat 10 of each one of the grip elements 2.

The bar 9 can for example engage each grip element 2 while such grip element moves on the first portion 3a, or on the second portion 3b, of the closed path 3.

As is particularly evident from the accompanying figures, in order to ensure the movement of each tooth 4a, 4b of the grip element 2, the adjustment device 6 can comprise two mutually parallel bars 9 arranged at the same fraction of the closed path 3.

According to an embodiment of particular practical interest, described by way of non-limiting example of the invention, each bar 9 that faces a fraction of the closed path 3 is matched by another bar that is arranged in a parallel configuration on the opposite side with respect to the closed path 3: substantially, for each pair thus formed, one of the two bars 9 engages the grip elements 2 while such grip elements travel along the first portion 3a, while the other bar 9 engages the grip elements 2 along the second portion 3b.

The two bars 9 of the pair described above are mutually connected by means of connecting ribs 11, which for example can be two and can be arranged proximate to their ends 9a, 9b.

It should be noted that the movement of the bars 9 transversely with respect to the advancement direction of the grip elements 2 is guided by at least one suitable first guiding rail 12, along which the connecting ribs 11 are arranged slidingly.

Advantageously, the adjustment device 6 comprises at least one first screw 13, which is arranged outside the closed path 3 and engages a first female thread formed in a block 14, which is jointly connected to at least one of the connecting ribs 11.

For greater symmetry of the adjustment device 6, to ensure greater structural rigidity, both connecting ribs 11 are arranged slidingly on a respective first guiding rail 12 and have a respective block 14 and a respective first female thread in which a corresponding first screw 13 can turn.

Thanks to the particular type of coupling described, a rotation of the first screw 13 around its own axis is capable of actuating the movement of each bar 9 along a direction that is substantially transverse with respect to the advancement direction, thus providing the desired adjustment of the transverse position of the teeth 4a, 4b of the grip elements 2.

Figure 2:
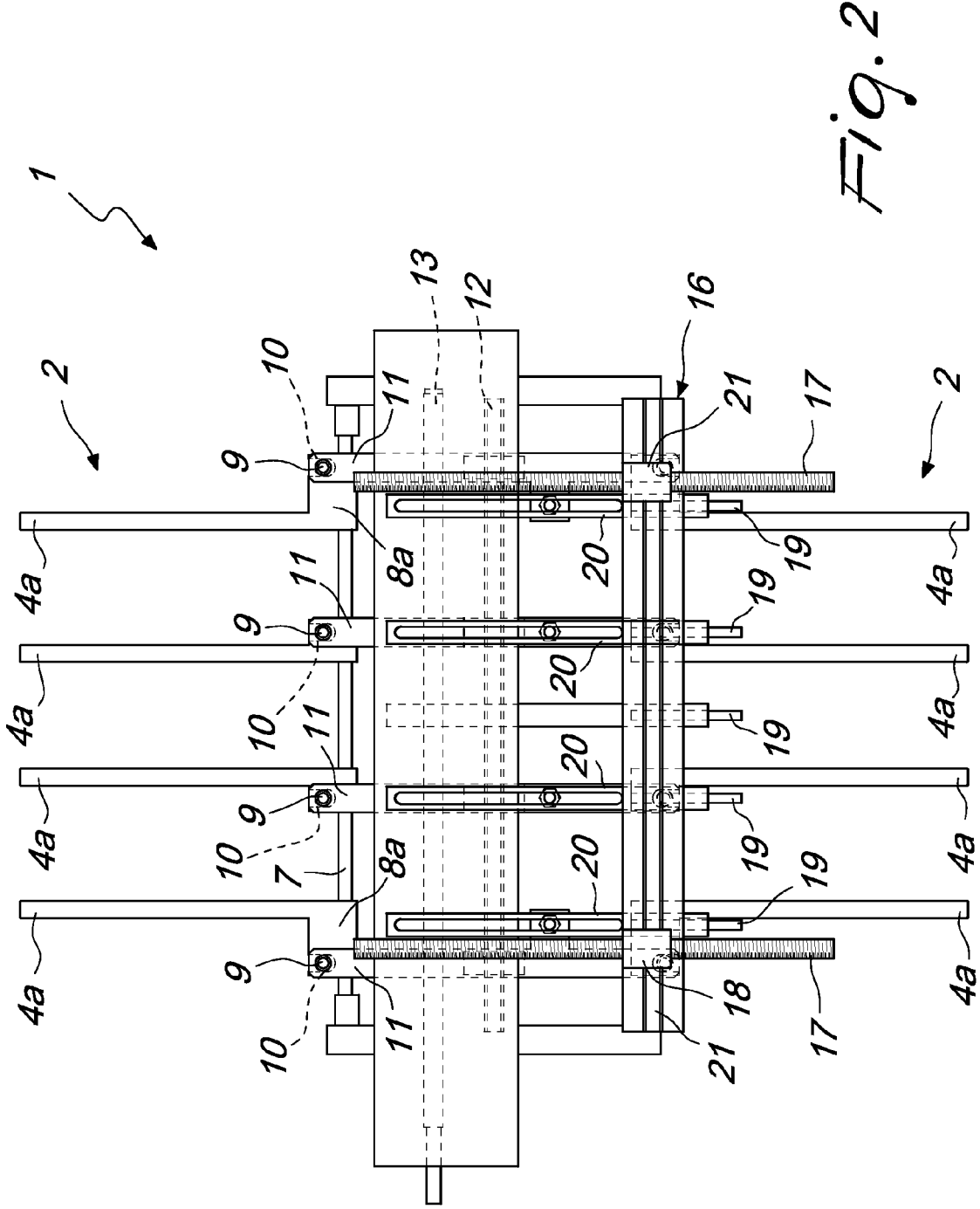

In order to obtain a better clamping of the products 5 and allow a more precise adjustment of the transverse position of the teeth 4a, 4b, each grip element 2 comprises a plurality of pairs of teeth 4a, 4b (for example four, as is in the embodiment shown in the accompanying FIGS. 2 and 3).

The adjustment device 6 comprises, in this case, a plurality of bars 9 (for example, again with reference to the accompanying FIGS. 2 and 3, four pairs of bars 9); each bar 9 engages a respective pair of teeth 4a, 4b of each grip element 2, and each bar 9 is coupled, by means of one of the above-mentioned connecting ribs 11, to another bar 9 arranged on the opposite side with respect to the closed path 3.

The first screw 13 engages in this case a plurality of first female threads, which are formed in respective blocks 14 and have appropriate mutually different threads in order to allow the corresponding bars 9 to move according to different rules of motion as a consequence of the rotation of the first screw 13, as shown for example in FIGS. 2 and 3.

Conveniently, the traction unit 1 according to the invention comprises an assembly for guiding the grip elements 2 along the connecting portions 3c.

The bars 9 in fact engage the grip elements 2 only while such grip elements travel along the first portion 3a and the second portion 3b. Without the presence of the guiding assembly, any vibration of the unit 1 during regular operation or any plays occurring within the elements that provide coupling with the movement means would cause the grip elements 2 to vary, albeit slightly, their transverse arrangement, once coupling to one bar 9 has been lost, before engaging the next one. The described movement would therefore cause a collision between the grip element 2 and the next bar 9 upon coupling or even make it impossible to provide such coupling.

In particular, the guiding assembly comprises the above-mentioned connecting ribs 11, which together with the pair of bars 9 to which they are fixed subtend metal sheets 15, which engage the seats 10 of the grip elements 2 in order to guide them during advancement along the connecting portions 3c.

As noted, the teeth 4a, 4b are capable of clamping the products 5 laterally in order to entrain them along the closed path 3; the traction unit 1 according to the invention also comprises a contrast element 16, which is arranged substantially parallel to the first portion 3a with an adjustable center distance.

The contrast element 16 constitutes a stop abutment for the products 5 at the end of the movement performed by the pusher, and a base 5a of the products 5 rests thereon, such products being thus kept more compact during their traction along the first portion 3a.

In order to adjust the center distance between the first portion 3a and the contrast element 16, the latter can move along a direction that is perpendicular to the first portion 3a and movement in such direction is guided by a second screw 17. The second screw 17 in fact engages a second female thread, which is formed in a carriage 18 that is functionally associated with the contrast element 16: as a consequence of the rotation about its own axis of the second screw 17, the contrast element 16 can follow jointly the movement of the carriage 18 along such direction that is perpendicular with respect to the first portion 3a.

Advantageously, the traction unit 1 according to the invention comprises an apparatus for adjusting the transverse position of the contrast element 16, so that it too can adapt to the various formats of the products 5 to be packaged. Such adjustment apparatus is functionally associated with the adjustment device 6 along the direction that is transverse with respect to the advancement direction of the grip elements 2: in this manner, by acting on the device 6 it is possible to achieve the simultaneous adjustment of the transverse position of the pairs of teeth 4a, 4b (as described) and of the contrast element 16.

More particularly, the contrast element 16 comprises a plurality of rods 19, on which the bases 5a of the products 5 abut: the rods 19 can move along the direction that lies transversely with respect to the advancement direction in order to adapt to the different formats of the products 5.

In order to guide such motion of the rods 19, the adjustment apparatus comprises a plurality of ribs 20, each of which connects a respective rod 19 to a corresponding connecting rib 11: the rods 19 can thus follow jointly the motion that is transverse with respect to the advancement direction of the ribs 11 and of the bars 9.

The transverse motion of the rods 19 is guided by at least one second guiding rail 21 (and which, with reference to the accompanying figures, can be for example two).

The operation of the traction unit according to the invention is as follows.

By actuating the first screw 13 it is possible to achieve the simultaneous movement of the bars 9 and of the connecting ribs 11 fixed thereto: in this manner, the desired adjustment of the position of the teeth 4a, 4b of the grip elements 2, transversely with respect to the advancement direction (in addition to the adjustment of the rods 19 of the contrast element 16), is achieved.

As can be noted easily, all the components of the adjustment device 6 are arranged outside the closed path 3, while the movement means are typically arranged inside the closed path 3. The greater space available and the absence of risk of interference therefore leaves, as is evident, greater design freedom for providing the above mentioned movement means and adjustment device 6.

The result achieved is the desired structural simplification of the entire traction unit 1, which further has an adjustment device 6 which, being separate from the movement means, is not influenced by any elongations thereof.

The sizing of the bars 9, performed during the design of the unit 1, in fact can conveniently provide for any elongations of the movement means, since there are no substantial upper constraints of a structural kind for the length of the bars 9.

Finally, the metal sheets 15 perform the useful additional function of guiding the grip elements 2 during their movement along the connecting portions 3c, in which they do not engage the bars 9.

It should be noted that the transverse adjustment of the metal sheets 15 is actuated by the adjustment device 6, since it is responsible for the positioning of the bars 9, to which the connecting ribs 11 and therefore the metal sheets 15 are jointly connected. It is therefore not necessary to provide the unit 1 with an additional component that adjusts the metal sheets 15.

In practice it has been found that the traction unit according to the invention fully achieves the intended aim, since resorting to an adjustment device for the transverse positioning of the grip elements, arranged outside the closed path that they trace, allows to avoid interferences with the movement means, thus ensuring high structural simplicity to the entire unit.

The invention thus conceived is susceptible of numerous modifications and variations, all of which are within the scope of the appended claims; all the details may further be replaced with other technically equivalent elements.

In the exemplary embodiments shown, individual characteristics, given in relation to specific examples, may actually be interchanged with other different characteristics that exist in other exemplary embodiments.

Moreover, it is noted that anything found to be already known during the patenting process is understood not to be claimed and to be the subject of a disclaimer.

In practice, the materials used, as well as the dimensions, may be any according to requirements and to the state of the art.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A traction unit, for packaging machines, comprising:
a plurality of grip elements; and
movement means for moving the plurality of grip elements, which can move along a predefined closed path and each of the plurality of grip elements having at least two pairs of teeth that protrude substantially at right angles from said closed path, for the clamping of products to be packaged and permitting their traction along a portion of said closed path, the mutual transverse arrangement of said pairs of teeth being configurable by means of an adjustment device, wherein said adjustment device is located substantially outside said closed path, said movement means is located substantially inside said closed path, and said adjustment device includes at least one bar that extends parallel to a fraction of said closed path to engage the teeth of the plurality of grip elements, the engagement allowing simultaneous transverse adjustment of the plurality of grip elements.

2. The traction unit according to claim 1, wherein the traction unit comprises a contrast element arranged substantially parallel to said portion of said closed path according to an adjustable center distance, a base of said products, clamped by said teeth, abutting against said contrast element.

3. The traction unit according to claim 2, wherein the traction unit comprises an apparatus for adjusting a transverse position of said contrast element, said apparatus being jointly associated with said adjustment device, along the direction that lies transversely with respect to an advancement direction of said grip elements.

4. The fraction unit according to claim 1, wherein the at least one bar, which can move on command along a direction that lies transversely with respect to an advancement direction of said grip elements, said at least one bar being engageable in a seat that is formed on each one of said grip elements, for at least the part of the stroke of each one of said grip elements that corresponds to said fraction of said closed path.

5. The traction unit according to claim 1, wherein said closed path has a first substantially straight portion for the traction of the products to be packaged, a second substantially straight portion, parallel to the first portion, for the return stroke of the grip elements, and two substantially semicircular connecting portions, said bar engaging said grip elements along either said first portion or said second portion.

6. The traction unit according to claim 1, wherein said adjustment device comprises at least one pair of bars, which are arranged parallel on two opposite sides of said closed path, each one of said bars engaging said grip elements along either a first substantially straight portion or a second substantially straight portion parallel to the first substantially straight portion, said bars being mutually interconnected, by means of connecting ribs.

7. The traction unit according to claim 6, wherein said adjustment device comprises at least one first screw, which is arranged outside said closed path and engages a first female thread that is formed in a block that is jointly connected to at least one of said connecting ribs, the rotation of said first screw actuating the movement of each one of said bars along a direction that is substantially transverse with respect to an advancement direction.

8. The traction unit according to claim 1, wherein each one of said grip elements comprises a plurality of said pairs of teeth, said adjustment device comprising a plurality of said bars and at least one first screw which is arranged outside said closed path, each bar engaging a respective pair of said teeth of each one of said grip elements, said bars arranged on opposite sides of said closed path being coupled in pairs by means of respective connecting ribs, said at least one first screw mating with a plurality of first female threads formed in corresponding blocks that are fixed to each one of said connecting ribs.

9. The traction unit according to claim 3, wherein said contrast element comprises a plurality of rods, which define the abutment for said base of said products, each one of said rods being associated functionally with connecting ribs, by means of said apparatus, to adjust the transverse position of contrast element.

10. The traction unit according to claim 1, wherein the traction unit comprises an assembly for guiding said grip elements along connecting portions, the connecting portions coupling a first substantially straight portion for the traction of the products to be packaged and a second substantially straight portion, parallel to the first portion.

11. The traction unit according to claim 1, wherein a guiding assembly is constituted substantially by metal sheets, each one of said metal sheets being subtended by connecting ribs and by a pair of bars, said metal sheets engaging seats of said grip elements to channel and guide their motion along connecting portions, the connecting portions coupling a first substantially straight portion for the traction of the products to be packaged and a second substantially straight portion, parallel to the first portion.

* * * * *

UNITED STATES PATENT AND TRADEMARK OFFICE
CERTIFICATE OF CORRECTION

| | | |
|---|---|---|
| PATENT NO. | : 8,727,106 B2 | |
| APPLICATION NO. | : 13/386398 | |
| DATED | : May 20, 2014 | |
| INVENTOR(S) | : Francesco Maria Bernardi | |

It is certified that error appears in the above-identified patent and that said Letters Patent is hereby corrected as shown below:

In the claims
    Column 7, Line 14
    "4. The fraction unit according to claim 1, wherein the at" should read, --4. The traction unit according to claim 1, wherein the at--.

Signed and Sealed this
Second Day of February, 2016

Michelle K. Lee
*Director of the United States Patent and Trademark Office*